United States Patent [19]

Reinartz et al.

[11] Patent Number: 4,951,470
[45] Date of Patent: Aug. 28, 1990

[54] TANDEM MASTER CYLINDER

[75] Inventors: Hans-Dieter Reinartz, Frankfurt am Main; Helmut Steffes, Hattersheim; Philipp Kilb, Eppstein, all of Fed. Rep. of Germany

[73] Assignee: Alfred Teves GmbH, Frankfurt am Main, Fed. Rep. of Germany

[21] Appl. No.: 318,994

[22] Filed: Mar. 3, 1989

[30] Foreign Application Priority Data

Mar. 15, 1988 [DE] Fed. Rep. of Germany ....... 3808522

[51] Int. Cl.$^5$ ................... B60T 8/32; B60T 13/12; B60T 11/20
[52] U.S. Cl. ..................... 60/562; 60/585; 60/589
[58] Field of Search ............... 60/562, 585, 589, 592

[56] References Cited

U.S. PATENT DOCUMENTS

| | | | |
|---|---|---|---|
| 3,060,691 | 10/1962 | Davis | 60/562 |
| 3,064,432 | 11/1962 | Shutt | 60/562 |
| 3,522,706 | 8/1970 | Bueler | 60/562 |
| 3,701,257 | 10/1972 | Gaiser | 60/562 |
| 3,800,539 | 4/1974 | Le Marchand | 60/562 |
| 3,818,706 | 6/1974 | Gaiser | 60/562 |
| 4,084,377 | 4/1978 | Gaiser | 60/562 |
| 4,114,377 | 9/1978 | Shellhause | 60/562 X |
| 4,152,897 | 5/1979 | Falk | 60/562 |
| 4,197,710 | 4/1980 | Leiber | 60/585 X |
| 4,571,944 | 2/1986 | Kubota | 60/562 |
| 4,783,965 | 11/1988 | Kervagoret | 60/562 |
| 4,852,351 | 8/1989 | Price | 60/562 |

FOREIGN PATENT DOCUMENTS

| | | | |
|---|---|---|---|
| 0856264 | 11/1952 | Fed. Rep. of Germany | 60/585 |
| 2458632 | 7/1975 | Fed. Rep. of Germany | 60/585 |
| 2500902 | 7/1975 | Fed. Rep. of Germany | 60/562 |
| 0160606 | 9/1983 | Japan | 60/562 |
| 887631 | 1/1962 | United Kingdom | 60/562 |

Primary Examiner—Edward K. Look
Assistant Examiner—John E. Ryznic
Attorney, Agent, or Firm—Robert P. Seitter

[57] ABSTRACT

A tandem master cylinder for a hydraulic brake unit with slip control. In the housing of the brake unit a primary piston pre-loaded by a first return spring and a secondary piston pre-loaded by a second return spring define a primary and a secondary pressure chamber within a longitudinal bore. The pressure chambers are connected to a fluid reservoir and are associated with a first and a second control valve which release or shut off a second connection between the pressure chambers and the fluid reservoir depending on an actuating force. In order to reduce the overall axial length of the tandem master cylinder, the control valves (10, 11) are arranged outside the pistons (6, 7) and are actuated linearly by the pistons (6, 7).

26 Claims, 2 Drawing Sheets

TANDEM MASTER CYLINDER

BACKGROUND OF THE INVENTION

This invention relates to a tandem master cylinder for a hydraulic brake unit with slip control. In the housing of the brake unit a primary piston preloaded by a second return spring define a primary and a secondary pressure chamber within a longitudinal bore. The pressure chambers are connected to a fluid reservoir through intake chambers and nonreturn valves and are associated with a first and a second control valve which release or shut off a second connection between the pressure chambers and the fluid reservoir depending on an actuating force.

A tandem master cylinder of this type is described, for example, in the published German patent application No. 3627000 in conjunction with a slip-controlled brake unit. The particular feature of this tandem master cylinder is that its pistons are furnished with central control valves. Brake lines associated with the two pressure chambers communicate through intake lines with nonreturn valves incorporated therein, with motor-driven pumps whose suction connections are linked by way of a suction line to the fluid reservoir. In this manner, the central control valves operate as pressure limiting valves which are controlled depending on the pedal force and which limit the hydraulic pressure built up by the two pumps by releasing hydraulic fluid connections between the pressure chambers and the fluid reservoir depending on the foot force acting on the pedal. On brake operation and also in the event of a brake pressure control action, the hydraulic fluid flows through a small number of valves and on each slip control action, the two master cylinder pistons are completely restored in order to safeguard a maximum reserve for braking in the event of a failure of the pumps. In these known brake units it is a disadvantage that the master cylinder presents a considerable overall axial length which has a negative effect particularly when mounting the brake pressure transmitted in the engine compartment of an automotive vehicle.

It is, therefore, the object of the present invention to improve a tandem master cylinder of this type by reducing its overall axial length without impairing its functional reliability.

SUMMARY OF THE INVENTION

According to the present invention, this object is attained in that the control valves are arranged outside the pistons and are linearly controlled by the pistons. The control valves are accommodated in a valve body which preferably has an axially symmetrical configuration and is stationarily supported within a section of larger diameter of the longitudinal bore.

According to a particularly compact design of the present invention, the intake chambers of the primary, and the secondary pressure chamber are arranged outside the longitudinal bore in the housing in its cylindrical recesses and are separated from the fluid reservoir by means of nonreturn valves. The nonreturn valves are formed by flow interceptor cups which are located at retaining elements accommodated in the cylindrical recesses and provided with hydraulic fluid ducts.

In a further embodiment of the present invention a radial recess is provided in the wall of the axial bore of the valve body which forms an annular chamber in conjunction with the surface of the secondary piston. The annular chamber communicates with the fluid reservoir and is separated from the primary pressure chamber by means of a first sealing ring, and from the secondary pressure chamber by means of a second sealing ring. This provision affords the driver recognition of an untightness of one of the two sealing rings directly at the brake pedal.

BRIEF DESCRIPTION OF THE DRAWING

Further characteristics and advantages of the present invention are set forth in the following detailed description of one embodiment, taken in conjunction with the accompanying drawing, wherein.

DETAILED DESCRIPTION

Figure 1:
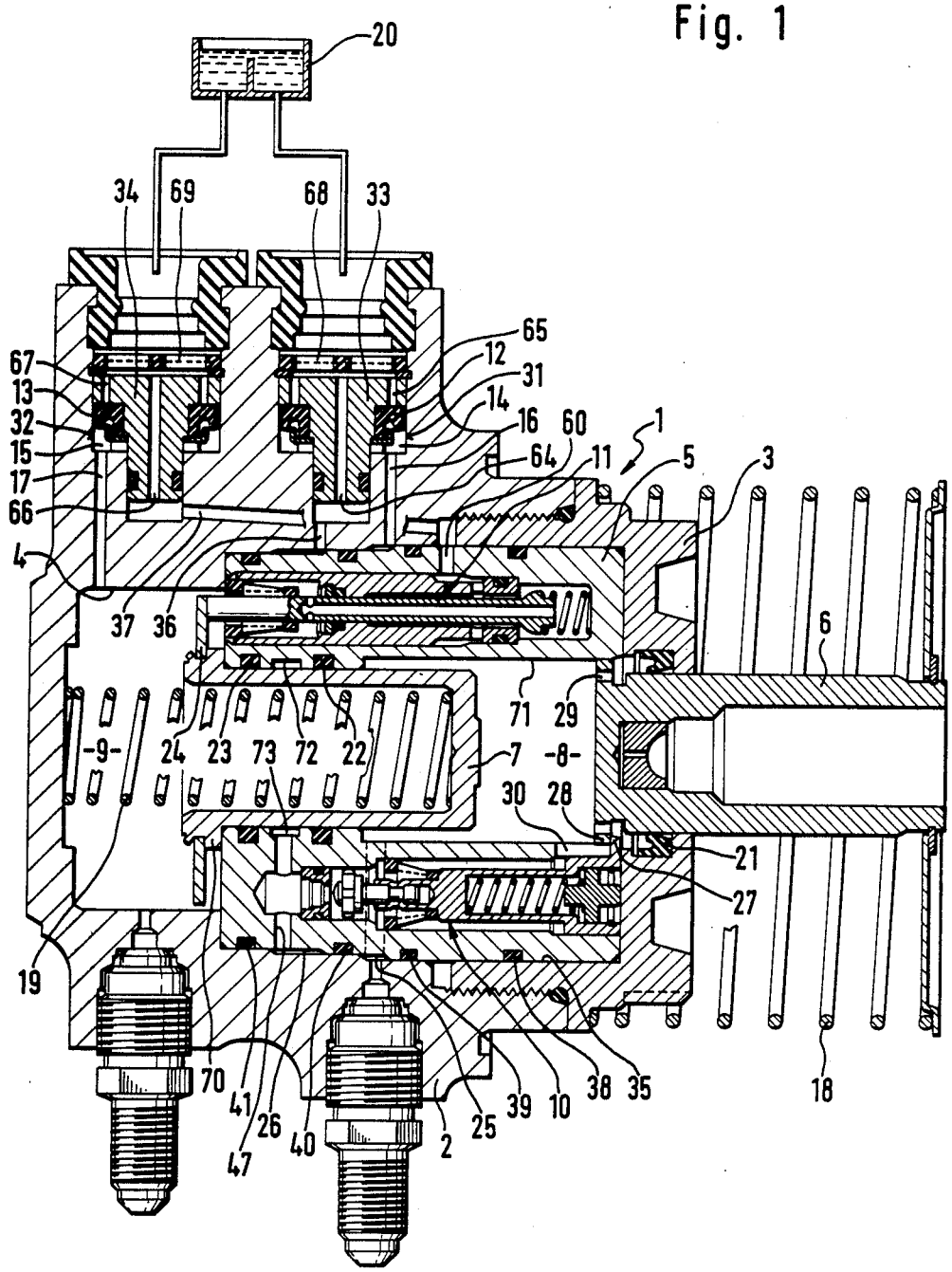
FIG. 1 shows a tandem master cylinder in accordance with the present invention in axial section.

The tandem master cylinder of the present invention as shown in FIG. 1 comprises a housing 2 in whose longitudinal bore 4 is a primary piston 6 and a secondary piston 7 define a primary pressure chamber 8 and a secondary pressure chamber 9. The longitudinal bore 4 which presents a section 35 of larger diameter is closed by a sealing element 3 at which a first return spring 18 is support to pre-load the primary piston 6. The sealing element 3, within which the primary piston 6 is sealed off by means of a sealing cup 21 is guided, partly surrounds a valve body 5. The valve body is incorporated in section 35 and preferably presents an axially symmetrical configuration in whose axial bore 71 forming the primary pressure chamber 8 the primary piston 7 which is arranged as a plunger piston is additionally guided axially by means of a guide collar 28 furnished with a plurality of bores 29. In this configuration section 35 is provided as a stepped bore whose steps in conjunction with annular surfaces of smaller diameters provided at the valve body 5 define two annular chambers 25, 26 communicating with the primary pressure chamber 8. The function of the annular chambers 25, 26 are described in the following. Sealing of the valve body 5 with respect to the sealing element 3 and to the section 35, respectively is carried out by means of four sealing rings 38, 39, 40 and 41 inserted into radial grooves of the valve body 5. The end of valve body 5 facing away from the primary piston 6 serves as a stop for the secondary piston 7 guided therein. The secondary piston 7 is formed with a radial collar 70 for this purpose. In this context, secondary piston 7 interacts with a first sealing ring 22 and with a second sealing ring 23 which are arranged in radial grooves of the valve body 5 and which separate an annular chamber 73 defined by a radial recess 72 in the valve body 5 and the surface of the secondary piston 7 from the primary pressure chamber 8, respectively, from the secondary pressure chamber 9. Between the bottom of longitudinal bore 4 and secondary piston 7 there is arranged a second return spring 19 which pre-loads the secondary piston 7 in the direction toward the valve body 5.

In order to suck hydraulic fluid from a fluid reservoir 20 in the event of return movements of the two pistons 6, 7, cylindrical recesses 31, 32 are provided in the housing 2 which from a first and a second intake chamber 14, 15 which are sealed off by means of nonreturn valves in the shape of flow interceptor cups 12, 13.

The flow interceptor cups 12, 13 are preferably arranged at retaining elements 33, 34 inserted in the cylindrical recesses 31, 32. The retaining elements 33, 34 are furnished with hydraulic fluid ducts 64, 65, 66 and preceded by two filters 68, 69 in the direction of flow of the hydraulic fluid from fluid reservoir 20 into the inner space of the housing 2. In this configuration, the intake chambers 14, 15 are associated to the individual pressure chambers 8, 9 in such a manner that while the first intake chamber 14 communicates with the primary pressure chamber 8 by means of a first intake duct 16 by way of the first annular chamber 25, the connection of the second intake chamber 15 to the secondary pressure chamber 9 is carried out through a second intake duct 17 directly.

In addition to the first hydraulic fluid connection described above, that is, between the pressure chambers 8, 9 and the fluid reservoir 20, a second connection is provided which is shut of by mean of a first control valve 10 and a second control valve 11 arranged within bores provided in the valve body 5. The second connection between the primary pressure chamber 8 and the fluid reservoir 20 is routed by way of a slot 30 formed in the valve body 5, by way of the open valve seat 46 (FIG. 2) of the first control valve 10, by way of a radial hydraulic fluid passage 47 in valve body 5, by way of the second annular chamber 26, by way of a hydraulic fluid duct 36 in the housing 2, and by way of the central bore 64 in the first retaining element 33. The second connection between the fluid reservoir 20 and the secondary pressure chamber 9 leads through the open valve seat 57 (FIG. 3) of the second control valve 11, through an annular chamber 59, described more fully hereinafter, through a radial hydraulic fluid duct 60 in the valve body 5, through a hydraulic fluid duct 37 provided in the housing 2, and through the central bore 66 of the second retaining element 34. The manner in which the two control valves 10, 11 are actuated by the guide collar 28 provided at the primary piston 6, respectively, by an actuating plate 24 located at the secondary piston 7 is described in greater detail in connection with FIGS. 2 and 3.

Figure 2:
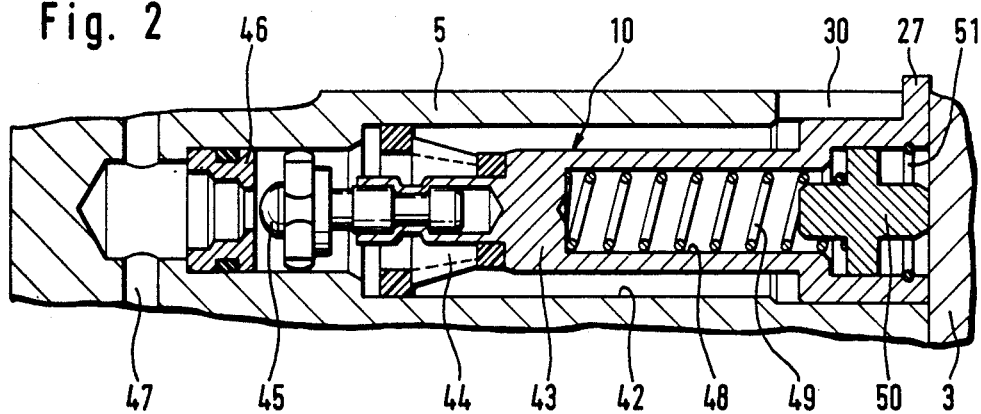
FIG. 2 shows a first embodiment of the control valve in accordance with the present invention which is also illustrated in axial section; and, FIG. 3 shows in axial section a second embodiment of the control valve.

As is illustrated in FIG. 2, the first control valve 10 comprises ah actuating element 43 axially slidably supported within a bore 42 of the valve body 5 and, furnished with a filter 44, bearing a hemispherical closing element 45 which interacts with the valve seat identified by the reference numeral 46. At its end facing away from the closing element 45, actuating element 43 is formed with a nose 27 which catches behind the guide collar 28 (not shown) of the primary piston 6 so that the actuating element 43 comes to rest against the sealing element 3 contrasting the action of a compression spring 49 disposed in its bore 48. Compression spring 49 takes support in this configuration at the sealing element 3. A supporting element 50 is interposed which is secured within a section of larger diameter of the bore 48 by means of a circlip 51. Due to the initial tension of the compression spring 49, the actuating element 43 will be slid in the direction of the valve seat 46 on compression spring 49 being relieved (shift of the primary piston 6 in the direction of actuation), so that the control valve 10 is closed and the second connection between the primary pressure chamber 8 and the fluid reservoir 20 is interrupted.

Figure 3:
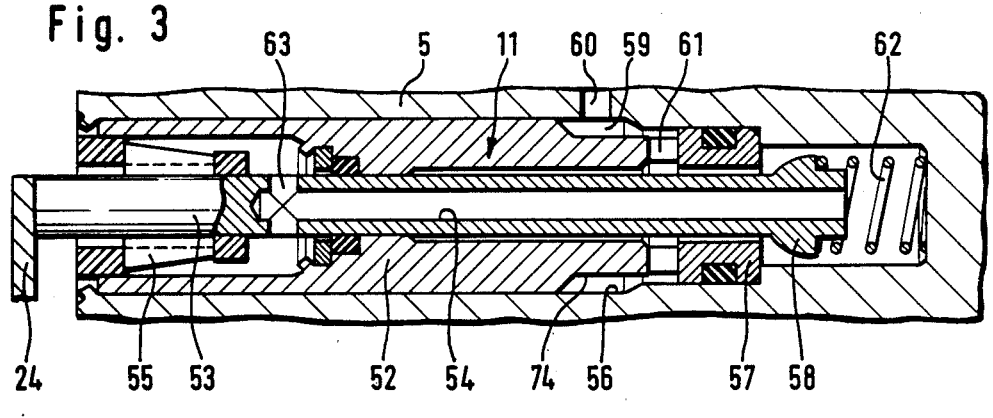

The second control valve 11 which is illustrated in FIG. 3 is comprised of a valve bushing 52 being stationarily supported within an axial bore 56 of the valve body 5 and guiding an actuating plunger 53 which bears a spherical segment-shaped losing element 58 and is furnished with two bores 63, 54 arranged vertically relative to each other. Actuating plunger 53 which is biased by means of a compression spring 62 interacts with the actuating plate 24 located at the secondary piston 7. The second connection between the secondary pressure chamber 9 and the pressureless fluid reservoir 20 leading by way of a filter 55 is being provided in the valve bushing 52, by way of the two bores 63, 54 of the actuating plunger 53, by way of the open valve seat 57, by way of a passage 61 configured in the valve bushing 52, and by way of the annular chamber 59 defined by a radial recess 74 of valve bushing 52. On actuation of the master cylinder, the compression spring 62 will be relieved by the sliding of the secondary piston 7 so that the spherical segment-shaped closing element 58 will close the valve seat 57 and the second connection between the secondary pressure chamber 9 and the fluid reservoir 20 will be interrupted.

What is claimed is:

1. A tandem master cylinder for a hydraulic brake unit with slip control, said unit including a housing, a primary piston pre-loaded by a first return spring and a secondary piston pre-loaded by a second return spring to define a primary and a secondary pressure chamber within a longitudinal bore thereof, said pressure chambers being connected to a fluid reservoir through intake chambers and non-return valves and being associated with a first and a second control valve which release or shut off a second connection between said pressure chambers and said fluid reservoir depending on an actuating force, wherein said control valves are arranged outside of said pistons and are linearly controlled by said pistons.

2. A tandem master cylinder as claimed in claim 1, said control valves are accommodated in a valve body which has an axially symmetrical configuration is stationarily supported within a section of larger diameter of said longitudinal bore.

3. A tandem master cylinder as claimed in claim 2, wherein said section is provided in the shape of a stepped bore whose steps in conjunction with annular surfaces of smaller diameter formed at said valve body define a first and a second annular chamber which communicate with said primary pressure chamber.

4. A tandem master cylinder as claimed in claim 3, wherein said first annular chamber is connected through a first intake duct to an intake chamber of said primary pressure chamber.

5. A tandem master cylinder as claimed in claim 3, wherein said second annular chamber is connected to said fluid reservoir and to said primary pressure chamber with said first control valve being interposed therein.

6. A tandem master cylinder as claimed in claim 5, wherein the connection of said second annular chamber to said primary pressure chamber is provided through a transverse bore and through a slot of said valve body.

7. A tandem master cylinder as claimed in claim 1, wherein said secondary pressure chamber is connected directly to a second intake chamber by means of a second intake duct.

8. A tandem master cylinder as claimed in claim 4 wherein said intake chambers are provided outside said longitudinal bore in said housing in the cylindrical recesses thereof and are separated from said fluid reservoir by means of said non-return valves.

9. A tandem master cylinder as claimed in claim 8, wherein said non-return valves are formed by flow interceptor cups which are located at retaining elements accommodated in said cylindrical recesses and are provided with hydraulic fluid ducts.

10. A tandem master cylinder as claimed in claim 9, wherein said retaining elements are preceded by filters.

11. A tandem master cylinder as claimed in claim 1, wherein said primary piston and the said secondary piston are provided in the shape of plunger pistons.

12. A tandem master cylinder as claimed in claim 11, wherein the said secondary piston is guided within said valve body.

13. A tandem master cylinder as claimed in claim 12, wherein said secondary piston is furnished with a radial collar which is abutted against said valve body in the release position.

14. A tandem master cylinder as claimed in claim 13, wherein said primary piston is guided in a sealing element.

15. A tandem master cylinder as claimed in claim 14, wherein said primary piston is furnished with a radial guide collar which interacts with the wall of an axial bore of the said valve body which forms aid primary pressure chamber.

16. A tandem master cylinder as claimed in claim 15, wherein said guide collar is furnished with a plurality of axially directed bores.

17. A tandem master cylinder as claimed in claim 16, wherein said wall of the said axial bore of said valve body a radial recess is provided which together with the surface of said secondary piston forms an annular chamber communicating with said fluid reservoir and being separated from said primary pressure chamber by means of a first sealing ring and from said secondary pressure chamber by means of a second sealing ring.

18. A tandem master cylinder as claimed in claim 17, wherein actuation of said first control valve is effected by means of said guide collar of said primary piston.

19. A tandem master cylinder as claimed in claim 18, wherein actuation of said second control valve is effected by means of an actuating plate located at said secondary piston.

20. A tandem master cylinder as claimed in claim 18, wherein said first control valve is formed by an actuating element slidably supported within a bore of said valve body and pre-loaded by a compression spring, said actuating element being formed with a nose interacting with said guide collar of said primary piston and being provided with a closing element which interacts with a valve seat being disposed in said bore.

21. A tandem master cylinder as claimed in claim 20, wherein said closing element is succeeded by a filter in the direction of flow of the hydraulic fluid toward said primary pressure chamber.

22. A tandem master cylinder as claimed in claim 20, wherein said compression spring arranged within a bore of said actuating element takes support at said sealing element with a supporting element being interposed therein.

23. A tandem master cylinder as claimed in claim 19, wherein said second control valve is formed by a valve bushing guiding an actuating plunger and being fixedly supported within an axial bore of said valve body, said actuating plunger bearing a spherical segment-shaped closing element which interacts with a valve seat being stationarily arranged in said axial bore and passing through said valve seat and being pre-loaded in the closing direction by a compression spring which takes support at the bottom of said axial bore.

24. A tandem master cylinder as claimed in claim 23, wherein said valve bushing is formed with a radial recess which together with the wall of said axial bore defines an annular chamber communicating through hydraulic fluid ducts with the said fluid reservoir and communicating through open valve seat and through bores in said actuating plunger with said secondary pressure chamber.

25. A tandem master cylinder as claimed in claim 24, wherein said first return spring is arranged outside said housing.

26. A tandem master cylinder as claimed in claim 24, wherein said secondary piston partly surrounds said second return spring.

* * * * *